(12) United States Patent
Shomura et al.

(10) Patent No.: US 9,816,423 B2
(45) Date of Patent: Nov. 14, 2017

(54) ENGINE FOR OUTBOARD MOTOR (71) Applicant: SUZUKI MOTOR CORPORATION, Hamamatsu-Shi, Shizuoka (JP)

(72) Inventors: Nobuyuki Shomura, Hamamatsu (JP); Ryuji Hamada, Hamamatsu (JP); Tomohiko Miyaki, Hamamatsu (JP); Toshio Hayashi, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 15/204,635

(22) Filed: Jul. 7, 2016

(65) Prior Publication Data
US 2017/0030239 A1 Feb. 2, 2017

(30) Foreign Application Priority Data

Jul. 31, 2015 (JP) .................. 2015-152485

(51) Int. Cl.
| | |
|---|---|
| *F01N 3/32* | (2006.01) |
| *B63H 20/00* | (2006.01) |
| *B63H 20/24* | (2006.01) |
| *F02M 35/16* | (2006.01) |
| *F01N 13/00* | (2010.01) |
| *F01P 5/04* | (2006.01) |
| *F01N 3/10* | (2006.01) |

(52) U.S. Cl.
CPC ........... *F01N 3/323* (2013.01); *B63H 20/001* (2013.01); *B63H 20/24* (2013.01); *F01N 3/10* (2013.01); *F01N 13/004* (2013.01); *F01P 5/04* (2013.01); *F02M 35/167* (2013.01); *F01N 2590/021* (2013.01); *Y02T 10/20* (2013.01)

(58) Field of Classification Search
CPC ...... B63H 20/00; B63H 20/001; B63H 20/32; B63H 20/24; B63H 21/32; B63H 21/10; B63H 3/10; B63H 3/32; F01N 3/323; F01N 13/004; F01N 3/04; F01P 5/04
USPC .............................................. 440/88 A, 89 R
See application file for complete search history.

(56) References Cited

U.S. PATENT DOCUMENTS 5,554,057 A * 9/1996 Abe ..................... B63H 20/245
440/89 H
2010/0056001 A1 3/2010 Konakawa et al.

FOREIGN PATENT DOCUMENTS

JP 2010053771 A 3/2010

* cited by examiner

*Primary Examiner* — Lars A Olson
(74) *Attorney, Agent, or Firm* — Troutman Sanders LLP (57) ABSTRACT

An engine for an outboard motor is provided with an engine body, an intake system configured to supply combustion air to the engine body, an exhaust passage formed by connecting the engine body and the middle and lower units thereunder, a catalyst provided in the exhaust passage, and an air pump configured to supply secondary air to the upstream side of the catalyst. The air pump is driven by an electric motor.

10 Claims, 7 Drawing Sheets

ENGINE FOR OUTBOARD MOTOR

CROSS-REFERENCE TO RELATED APPLICATIONS

This application is based upon and claims the benefit of priority of the prior Japanese Patent Application No. 2015-152485, filed on Jul. 31, 2015, the entire contents of which are incorporated herein by reference.

BACKGROUND OF THE INVENTION

Field of the Invention

The present invention relates to an engine for an outboard motor, and more particularly, to an engine for an outboard motor suitable for a catalyst-mounted model.

Description of the Related Art

An outboard motor mounted on a small boat and the like is configured such that an upper unit and a guide exhaust are connected to an upper part of a lower unit provided with a propeller, an engine is supported and fixed on the guide exhaust, the engine is covered by an engine cover, and a propeller is rotated and driven by the engine. An exhaust gas output from the engine is discharged to the seawater through an exhaust passage vertically provided on the side face of the engine across the upper and lower units.

In such an engine for an outboard motor, a catalytic converter may be provided in the exhaust passage in order to purify the exhaust gas and comply with an exhaust gas control requirement in some cases. Furthermore, an air pump configured to supply secondary air to the exhaust passage is provided in order to supply oxygen necessary to detoxify the exhaust gas by oxidizing hydrocarbons and carbon monoxides in the exhaust system.

For example, Japanese Laid-open Patent Publication No. 2010-53771 discusses an outboard motor provided with an air pump supported by an engine to supply secondary air to the upstream side of the catalytic converter in the middle of the exhaust passage. An air inlet port (air inlet hole) of the air pump is opened in a position higher than the engine inside a cowling in order to prevent water from mixing to the secondary air supplied by the air pump to the exhaust passage.

Patent Document 1: Japanese Laid-open Patent Publication No. 2010-53771

In general, an engine, an intake system, and an exhaust system of an outboard motor are housed in an engine housing covered by a cowling which is an engine cover. It is not easy to arrange accessories such as a catalytic converter or an air pump in addition to the intake and exhaust systems within a limited space of the engine housing. That is, a limitation inevitably exists in arrangement due to a relationship with neighboring components. It is difficult to compactly arrange a plurality of functional devices or components while the exhaust gas purification functionality is reliably obtained. In practice, this results in a size increase of the outboard motor.

SUMMARY OF THE INVENTION

In view of the aforementioned problems, it is therefore an object of the present invention to provide an engine for an outboard motor capable of accommodating efficient space use and effectively implementing compactification.

According to an aspect of the invention, there is provided an engine for an outboard motor including: an in-line multiple-cylinder engine body provided with a crankshaft having an axial line directed to a vertical direction and a plurality of vertically overlapping cylinders, the cylinders having axial lines directed backward in a horizontal direction; an intake system configured to supply combustion air to the engine body; an exhaust passage formed to connect the engine body and middle and lower units thereunder; a catalyst provided in the exhaust passage; and an air pump configured to supply secondary air to an upstream side of the catalyst in the exhaust passage, wherein the air pump is driven by an electric motor.

The engine for an outboard motor according to the invention may further include a ventilation unit provided with a flywheel magnet installed in a shaft end of the crankshaft to rotate in synchronization in an upper part of the engine body to serve as a ventilation fan and a flywheel cover that covers the flywheel magnet and is connected to a ventilation outlet of the engine cover, wherein the air pump and the electric motor are arranged in the vicinity of an ventilation inlet of the ventilation unit so that the air pump and the electric motor are cooled using the air flowing to the ventilation unit.

In the engine for an outboard motor according to the present invention, the ventilation inlet of the flywheel cover is provided with a ventilation air inlet hole formed by a gap from an outer circumference of the electric motor to cover at least an upper part of the electric motor.

DETAILED DESCRIPTION OF THE PREFERRED EMBODIMENTS

An engine for an outboard motor according to preferred embodiments of the present invention will now be described with reference to the accompanying drawings.

Figure 1:
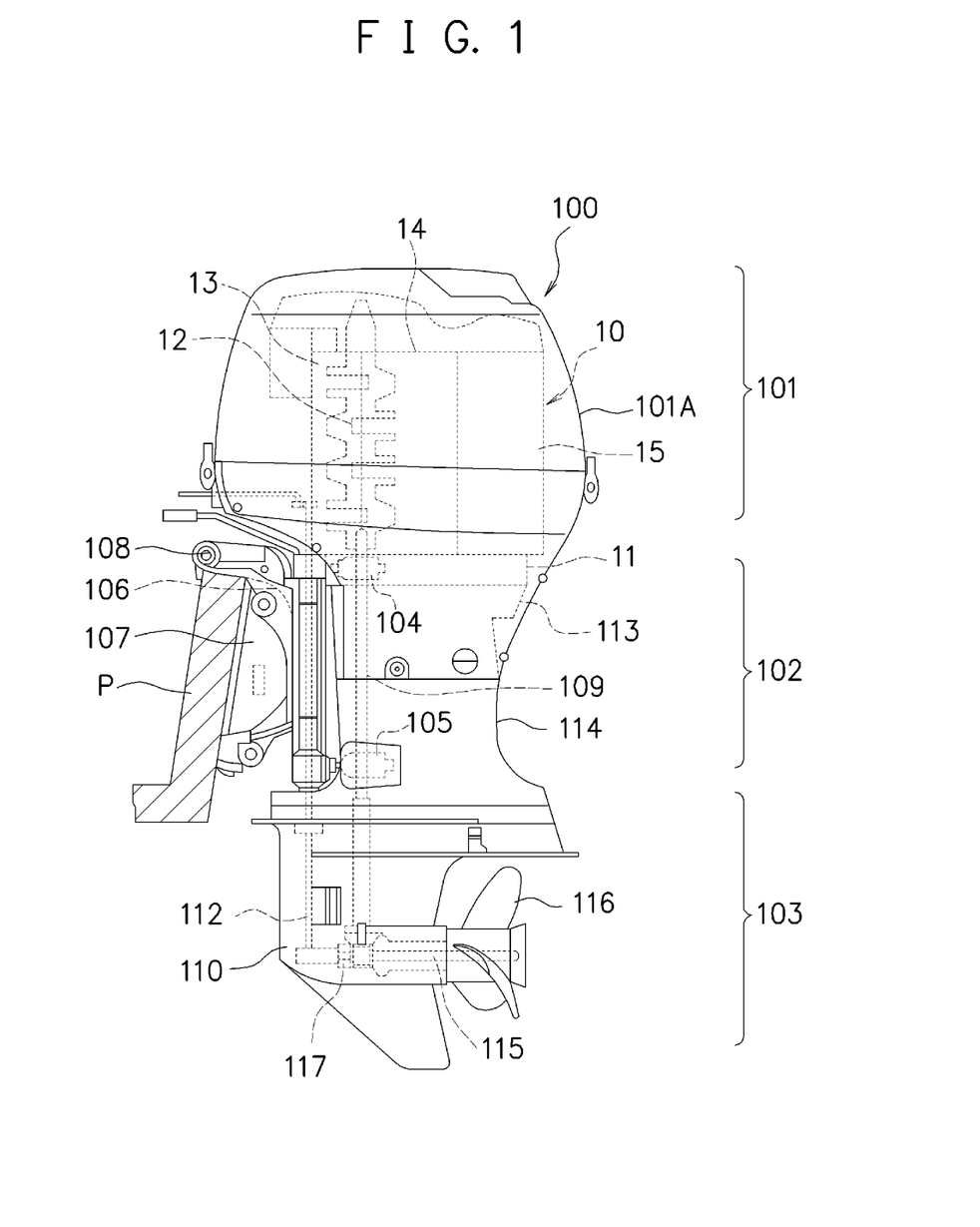
FIG. 1 is a left side view schematically illustrating an exemplary whole structure of an outboard motor according to a first embodiment of the invention.

FIG. 1 is a left side view schematically illustrating an exemplary structure of an outboard motor 100 according to the invention. In this case, a front side of the outboard motor 100 is fixed to a transom P of a ship hull as illustrated in FIG. 1. It is noted that, in the following description for each drawing, the arrow Fr denotes a front side of the outboard motor 100, the arrow Rr denotes a rear side of the outboard motor 100, the arrow R denotes a right side of the outboard motor 100, and the arrow L denotes a left side of the outboard motor 100 as necessary.

First Embodiment

In the entire configuration of the outboard motor 100, an upper unit 101, a middle unit 102, and a lower unit 103 are sequentially arranged from the upside to the downside. In the upper unit 101, the engine 10 is vertically installed in and supported by an engine holder 11 such that a crankshaft 12 is directed to a vertical direction. As the engine 10, various engine types such as an in-line multi-cylinder engine may be employed. A cylinder block 14, a cylinder head 15, and a cylinder head cover 16 are sequentially assembled to a crankcase 13 that supports the crankshaft 12. In the engine 10, a plurality of cylinders having cylinder axes directed backward in a horizontal direction are arranged in a vertically overlapping manner. Further, the engine 10 is covered by the engine cover 101A.

The middle unit 102 is supported by upper and lower mounts 104 and 105 horizontally pivotably around a support shaft set in a swivel bracket 106. A clamp bracket 107 is provided in both sides of the swivel bracket 106, so that the middle unit 102 is fixed to the transom P of the ship hull using the clamp bracket 107. The swivel bracket 106 is supported vertically pivotably around a tilt shaft 108 set in the left-right direction.

In the middle unit 102, a drive shaft 109 connected to a lower end portion of the crankshaft 12 of the engine 10 is arranged to vertically penetrate, so that a drive force of the drive shaft 109 is transmitted to a propeller shaft 111 arranged in a gear casing 110 of the lower unit 103. A shift rod 112 for shifting a gear position to forward or backward is arranged in front of the drive shaft 109 in parallel with the vertical direction. In addition, the middle unit 102 is also provided with an oil pan 113 for storing oil for lubricating the engine 10. Further, the middle unit 102 has a drive shaft housing 114 for housing the drive shaft 109.

In the lower unit 103, the gear casing 110 internally has a plurality of gear groups 117 and the like to rotatably drive the propeller 116 using the propeller shaft 115 by virtue of the drive force of the drive shaft 109. In the gear group 111, a gear provided in the drive shaft 109 extending downward from the middle unit 102 meshes with the gear of the gear casing 110 so as to finally rotate the propeller 116. However, a power transmission path of the gear group 117 in the gear casing 110 is switched, that is, shifted by performing a shift operation using the shift rod 112.

Figure 2:
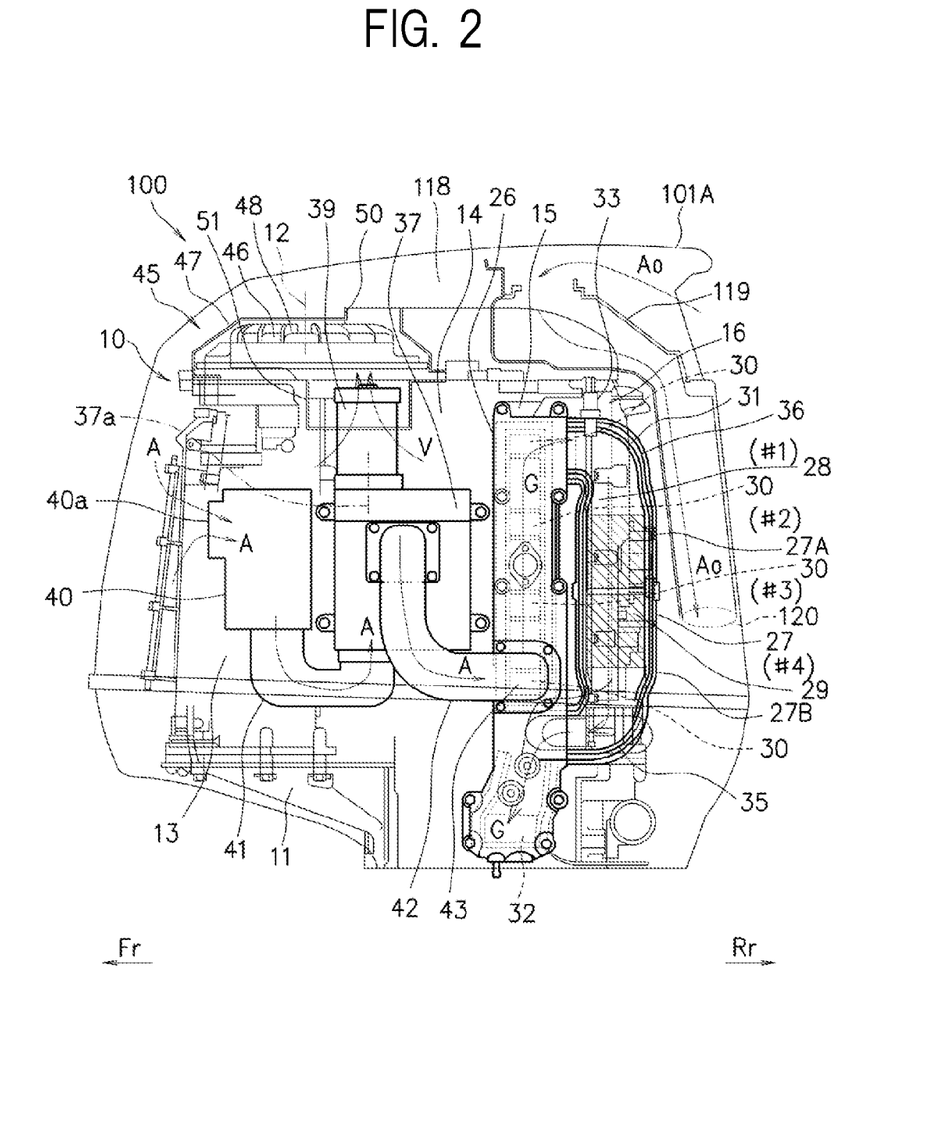
FIG. 2 is a left side view illustrating an engine of the outboard motor according to the first embodiment of the invention.
Figure 3:
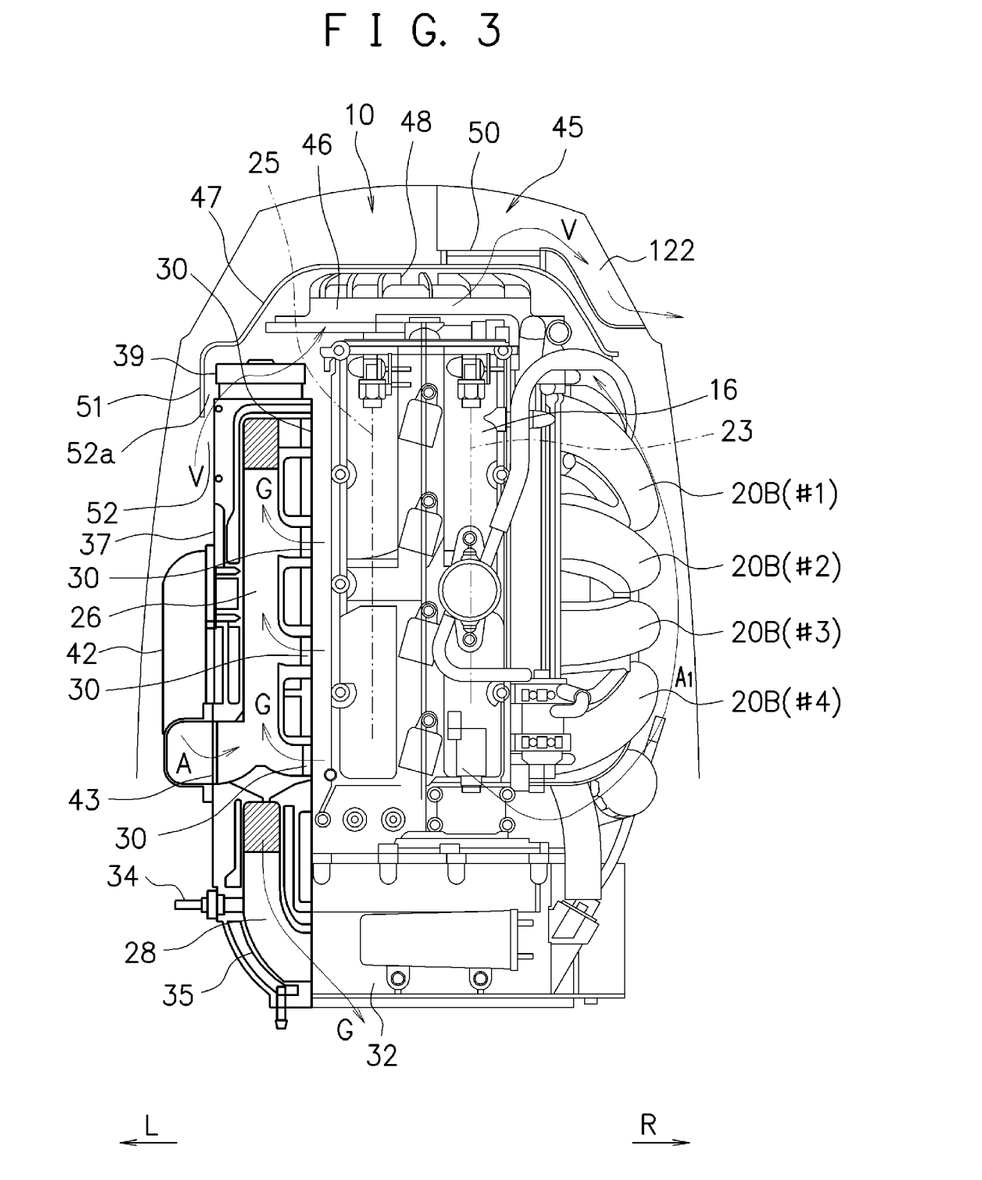
FIG. 3 is a rear front view illustrating the engine of the outboard motor according to the first embodiment of the invention.
Figure 4:
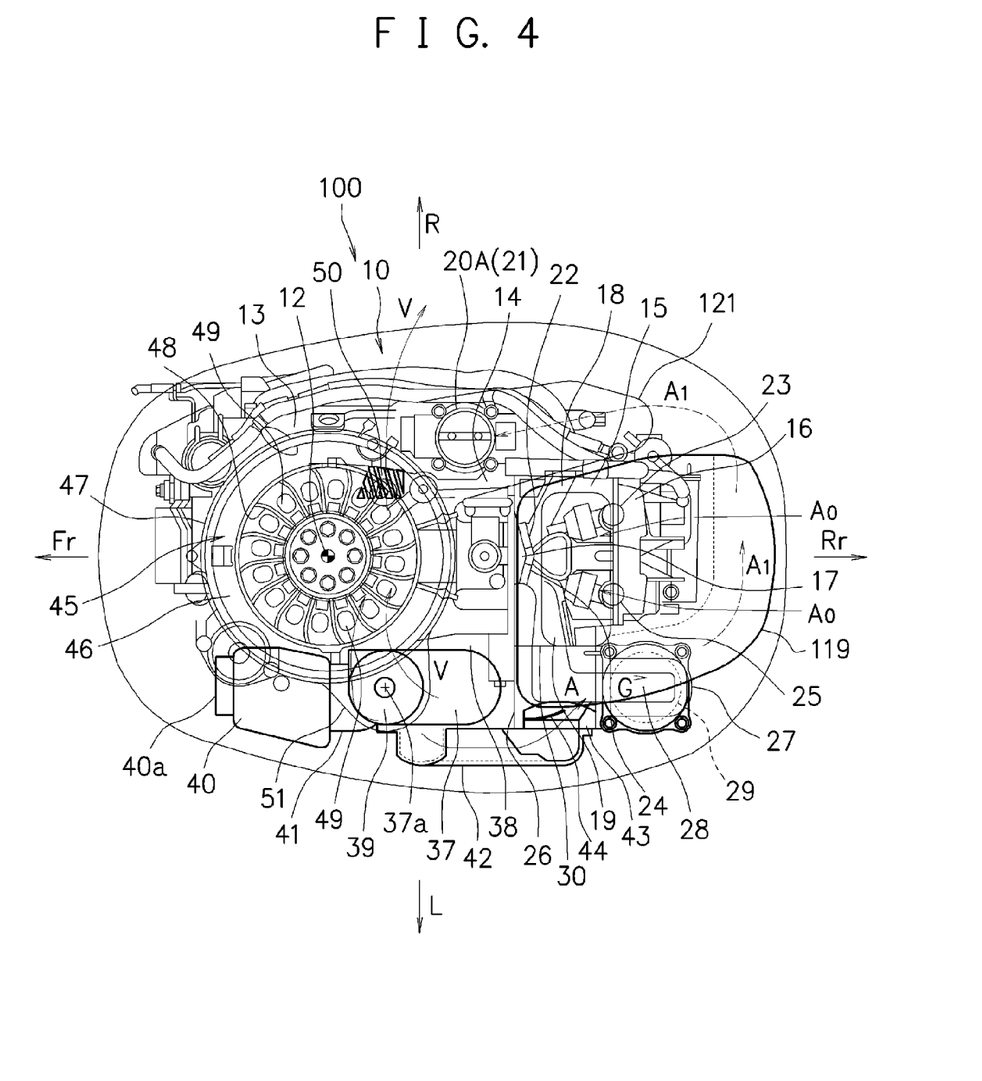
FIG. 4 is a top view illustrating the engine of the outboard motor according to the first embodiment of the invention.
Figure 5:
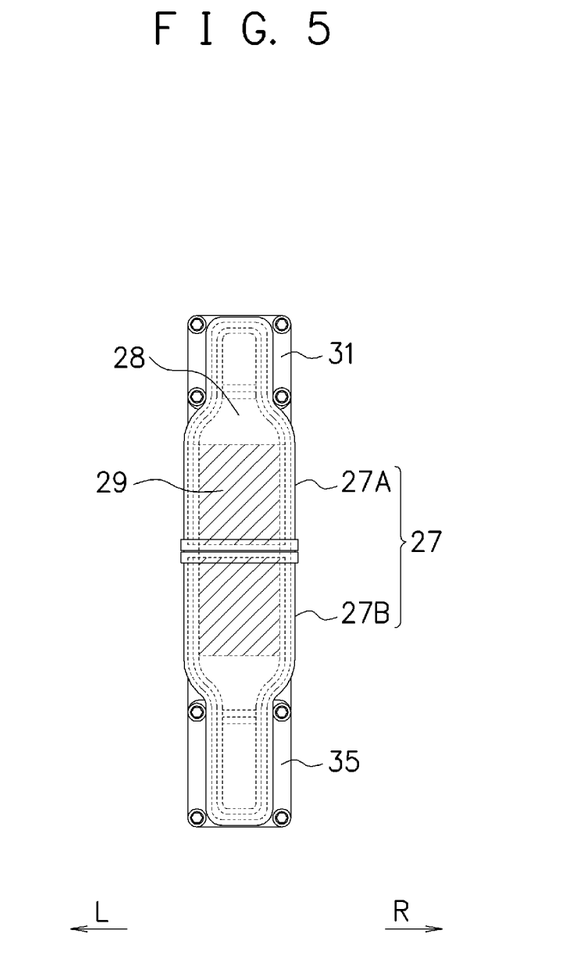
FIG. 5 is a rear view illustrating the surroundings of an exhaust system of the engine of the outboard motor according to the first embodiment of the invention.

FIGS. 2 to 4 illustrate an exemplary engine 10 according to this embodiment. FIG. 2 is a left side view illustrating the engine 10. FIG. 3 is a rear front view illustrating the engine 10. FIG. 4 is a top view illustrating the engine 10. It is assumed that the engine 10 of this embodiment is an in-line four-cylinder engine, in which four cylinders including the first cylinder #1, the second cylinder #2, the third cylinder #3, and the fourth cylinder #4 are sequentially arranged from the upside as illustrated in FIG. 3. The engine 10 is mounted onto the engine holder 11 in the fourth cylinder (#4) side such that the crankcase 13 is arranged in the front side, and the cylinder head 15 is arranged in the rear side. While the engine 10 will be described in brief with reference to FIGS. 2 to 4, some of the components thereof may be appropriately omitted or not as necessary for simplicity purposes. It is noted that FIG. 5 is a rear view illustrating the surroundings of the exhaust system of the engine 10.

In the crankcase 13, the crankshaft 12 is supported by a plurality of journal bearings in its upper end, middle, and lower end portions rotatably inside the crankcase 13. The lower end of the crankshaft 12 may also be coupled to the upper end of the drive shaft 109, for example, by interposing a pair of coupling gears (reduction gears). As a result, the rotational force of the crankshaft 12 is transmitted to the drive shaft 109.

The cylinder block 14 is internally provided with cylinder bores for each cylinder, so that pistons are inwardly fitted to the cylinder bores in a reciprocatable manner (in this example, in the front-rear direction). The piston is connected to a crank pin of the crankshaft 12 by interposing a connecting rod. As a result, a reciprocating motion of the piston inside the cylinder bore is converted into a rotational motion of the crankshaft 12 and is transmitted to the drive shaft 109 as the output power of the engine 10.

Referring to FIG. 4, the cylinder head 15 is provided with combustion chambers 17 matching cylinder bores of each cylinder and intake and exhaust ports 18 and 19 communicating with respective combustion chambers 17. In this example, an intake system is arranged in the right side of the engine 10, and an exhaust system is arranged in the left side of the engine 10. First, in the intake system, the intake air flows into an intake manifold with a flow rate controlled by a throttle body 20A arranged in the right side of the cylinder block 14. This intake air is supplied to an intake port 18 via an intake branch 20B configured to branch the intake air to each cylinder from the intake manifold (refer to FIG. 3). The throttle body 20A, the intake branch 20B, the intake manifold, and the like constitute an intake system 21 for supplying combustion air to the engine 10. For the open/close operation of the intake port 18, a communicating portion to the combustion chamber 17 is controlled by an intake valve 22. In this case, the intake valve 22 is driven by a cam provided in an intake cam shaft 23 provided to vertically extend. In addition, for the open/close operation of the exhaust port 19 in the exhaust system, a communicating portion to the combustion chamber 17 is controlled by an exhaust valve 24. In this case, the exhaust valve 24 is driven by a cam provided in an exhaust cam shaft 25 provided to vertically extend. It is noted that, in this embodiment, each cylinder may have a four-valve structure having a pair of valves (intake valves 22 and exhaust valves 24) for the intake and exhaust sides, respectively.

On top of the combustion chamber 17 of each cylinder, an ignition plug is installed, so that a mixed gas supplied to the inside of the combustion chamber 17 is ignited by the ignition plug. Furthermore, the combustion gas exploded and combusted inside each cylinder bore of each cylinder is discharged from the exhaust port 19 to the exhaust manifold 26. In each cylinder, the exhaust manifold 26 provided in the outer side portion of the cylinder bore of the cylinder block 14 is connected to the exhaust port 19 to communicate with each other. As illustrated in FIGS. 2 and 3, the exhaust manifold 26 is provided to vertically extend on the left side face of the cylinder head 15 so that the exhaust gases from each exhaust port 19 are joined. The confluent exhaust gas passes through the exhaust manifold 26 and is finally guided to the lower side of the engine 10 as described below. Then, the exhaust gas passes through an exhaust passage formed inside the engine holder 11 and is finally discharged to the water.

As an exemplary structure of the engine 10 according to this embodiment, a catalyst is installed in the middle of the exhaust passage of the exhaust system. As illustrated in FIG. 2, an exhaust passage is formed to extend from the exhaust manifold 26 via the catalyst housing portion 27 to the middle and lower units 102 and 103 provided in the lower part of the engine 10. The catalyst housing portion 27 is provided to extend vertically in parallel with the exhaust manifold 26 behind the exhaust manifold 26 and internally houses the catalyst 29. The exhaust manifold 26 included in a part of the exhaust passage is provided with a plurality of openings 30 (in this example, four openings) connected to the exhaust ports 19 of each cylinder. In addition, the upper parts of the exhaust manifold 26 and the catalyst housing portion 27 are connected to each other through a connection passage 31. Furthermore, the exhaust passage 28 extends downward while it is curved under the catalyst housing portion 27 and is connected to an exhaust communicating passage 32 formed inside the engine holder 11, so that the exhaust passage 28 communicates with the middle unit 102 through the exhaust communicating passage 32.

In this manner, the exhaust passage 28 includes the exhaust manifold 26, the connection passage 31, the catalyst housing portion 27, and the exhaust communicating passage 32. In the middle of the exhaust passage 28, oxygen concentration sensors 33 and 34 for detecting an oxygen concentration of the exhaust gas are installed in an exhaust upstream side and an exhaust downstream side, respectively, of the catalyst housing portion 27 that houses the catalyst 29. Specifically, the oxygen concentration sensors 33 and 34 are installed in a suitable region of the connection passage 31 (or the exhaust manifold 26) and a suitable region of an extension 35 extending from the lower side of the catalyst housing portion 27, respectively (refer to FIGS. 2 and 3). The oxygen concentration sensors 33 and 34 are capable of detecting an oxygen concentration of the exhaust gas in the vicinity of their installed regions. In addition, a water jacket 36 is provided in the outer circumferential portion of the passage generally along the entire length of the exhaust passage 28. As a result, a coolant sent from a water pump of a cooling system is circulated through the inside of the water jacket 36 to cool the exhaust passage 28.

Here, the catalyst housing portion 27 is vertically divided into an upper half body 27A and a lower half body 27B in its middle, and the upper and lower half bodies 27A and 27B are arranged in a mirror symmetrical relationship with respect to a dividing surface. In this case, each edge of the upper and lower half bodies 27A and 27B of the catalyst housing portion 27 vertically bisected with respect to the dividing surface is formed in a flange shape, and the flange-shaped portions are fastened to each other using bolts and the like. The catalyst 29 can be mounted from an opening formed in a portion of the dividing surface of the bisected catalyst housing portion 27.

In the engine 10, the crankcase 13, the cylinder block 14, the cylinder head 15, and the cylinder head cover 16 generally constitute an engine body. An intake system 21 for supplying combustion air to the engine body is arranged in one side of the engine body in the left-right direction, that is, in the right side in this example. In addition, an exhaust passage 28 for discharging the combustion gas from the engine body is arranged in the other side of the engine body in the left-right direction, that is, in the left side in this example.

In the exhaust system, the exhaust gases discharged from the exhaust ports 19 of each cylinder flow into the opening 30 of the exhaust manifold 26 and are joined inside the exhaust manifold 26 (in FIGS. 2 to 4, the arrow G denotes the flow of the exhaust gas as necessary). The confluent exhaust gas flows upward inside the exhaust manifold 26 and flows into the catalyst housing portion 27 through the connection passage 31 in an upper part thereof. The exhaust gas further passes through the catalyst 29 inside the catalyst housing portion 27 and flows into the extension 35 from the lower part of the catalyst housing portion 27. Then, the exhaust gas passes through the exhaust communicating passage 32 inside the engine holder 11 and is discharged to the water through the middle unit 102 and the lower unit 103.

An air pump 37 configured to supply secondary air to the upstream side of the catalyst 29 is further provided in the exhaust passage 28. This air pump 37 supplies the secondary air to the exhaust gas flowing through the exhaust passage 28 in order to purify the exhaust gas, that is, supplies oxygen necessary to oxidize and detoxify hydrocarbons and carbon monoxides in the exhaust system. That is, oxidization of the exhaust gas is promoted by reacting oxygen with the exhaust gas, and a discharge amount of hydrocarbons and carbon monoxides is reduced.

According to this embodiment, the air pump 37 is arranged in the left side, that is, in the same side as that of the exhaust passage 28 with respect to the engine body. As a type of the compressor employed in the air pump 37, a root type, a Lysholm type, a centrifugal type, and the like are known in the art, and any type of the pump may be suitably employed. In this example, as illustrated in FIGS. 2 and 4, the air pump 37 is arranged in a front side of the engine body relative to the exhaust manifold 26. A rotation shaft 37a of the air pump 37 may be set in the vertical direction. The air pump 37 is tightly fixed to a side wall of the cylinder block 14 by a bolt and the like in a concave portion 38 (FIG. 4) on a side face of the cylinder block 14 generally spanning across the #1 to #2 cylinders.

The air pump 37 is an electric type and has an electric motor 39 as its driving source. In this example, the electric motor 39 is mounted to the air pump 37 so that an output shaft of the electric motor is connected to the rotation shaft 37a of the air pump 37a directly or indirectly by interposing a gear. The driving of the air pump 37 can be controlled by operating or stopping the electric motor 39. Here, since the fuel supplied to the engine 10 becomes rich in the event of acceleration of the outboard motor 100 and the like, an oxygen concentration of the exhaust gas becomes thin. Therefore, activity of the catalyst 29 in the exhaust passage 28 is reduced naturally. According to this embodiment, the air pump 37 is driven and controlled to supply the secondary air to the exhaust gas on the basis of an oxygen concentration detection value of the oxygen concentration sensor 34 provided in the downstream side of the exhaust system in order to maintain activity of the catalyst 29. In this case, the oxygen concentration detection value of the oxygen concentration sensor 34 is transmitted to an engine control unit (ECU) mounted to the outboard motor 100. The ECU operates the electronic motor 39, that is, controls the driving of the air pump 37 depending on whether or not the oxygen concentration of the exhaust gas is equal to or higher than a predetermined threshold value on the basis of the oxygen concentration information.

An air inlet 40 for receiving the secondary air is connected to the air pump 37, and the secondary air is supplied from the air inlet 40 to the air pump (in FIG. 2, the arrow A denotes a flow of the secondary air). In this example, the air inlet 40 and the air pump 37 are connected to each other by interposing a connecting tube 41. The air inlet 40 is arranged in a lateral side of the crankcase 13 closely to the front side of the air pump 37 and has a generally cavity structure. In addition, an intake duct 40a for receiving the air is opened in a front end of the air inlet 40, as illustrated in FIG. 2. The air inlet 40 has a gas-liquid separation capability and a sound muffling capability for the received air. Further, the air inlet 40 may be embedded with an air filter, and as a result, the secondary air blowing to the air pump 37 is purified.

Here, the engine 10, the intake system, and the exhaust system are housed in the engine housing 118 covered by the engine cover 101A (cowling). An external air guide unit for guiding the external air from an upper part of the engine housing 118 to the inside of the engine housing 118, specifically, an external air intake duct 119 is provided as illustrated in FIG. 2. In the vicinity of the bottom of the external air intake duct 119, an inflow port 120 for receiving the air guided from the external air intake duct 119 is opened in a rear part of the engine housing 118 behind the engine body (in FIG. 2, the arrow $A_0$ denotes a flow of the air guided to the inside of the engine housing 118). The intake duct 40a of the air inlet 40 is set vertically higher than the inflow port 120 of the external air intake duct 119 in a front part of the engine housing 118. The external air intake duct 119 has a gas-liquid separation capability for the received air in its upper part.

The air flowing to the inside of the engine housing 118 from the inflow port 120 is input from the throttle body 20A through the air inlet duct 121 for an intake of the engine 10. The air inlet duct 121 covers an upper part of the throttle body 20A as illustrated in FIG. 4 so that the air inside the engine housing 118 is directed to the throttle body 20A as indicated by the arrow $A_1$ in FIG. 4 and flows along the air inlet duct 121.

According to this embodiment, the air pump 37 and the exhaust manifold 26 as a part of the exhaust passage 28 are connected to each other by interposing a secondary air supply passage 42. The secondary air supply passage 42 extends downward from the left side face of the air pump 37, is curved to the rear side, and then extends to the left side face of the exhaust manifold 26. A leading end portion of the secondary air supply passage 42 is opened for connection to the exhaust manifold 26. The connecting portion 43 of the exhaust passage 28 for connection to the secondary air supply passage 42 is provided in an upstream side of the exhaust flow direction relative to the catalyst housing portion 27, and particularly, in this example, in the most upstream side of the exhaust flow direction in the exhaust manifold 26 (a region approximately matching the #4 cylinder). A reed valve 44 (check valve) is installed in the connecting portion 43 as illustrated in FIG. 4. The reed valve 44 prevents a reverse flow of the exhaust gas from the exhaust passage 28 to the air pump 37.

As described above, in the exhaust system, the exhaust gases discharged from the exhaust ports 19 of each cylinder flow to the opening 30 of the exhaust manifold 26 and are joined inside the exhaust manifold 26. The confluent exhaust gas flows to the catalyst housing portion 27 through the connection passage 31. As the exhaust gas passes through the catalyst 29 inside the catalyst housing portion 27, hydrocarbons, carbon monoxides, and nitrogen oxides predominantly contained in the exhaust gas are oxidized or reduced. As a result, hazardous substances of the exhaust gas are removed, that is, the exhaust gas is purified. For efficient oxidization or reduction, it is necessary to set a theoretical air-fuel ratio by which the fuel and the air are perfectly combusted, and no oxygen remains. An oxygen concentration of the exhaust gas is monitored by oxygen concentration sensors 33 and 34 at all times. The ECU operates the electronic motor and drives the air pump 37 on the basis of the oxygen concentration detection value. In this case, the ECU can properly set the electric motor 39, that is, the rotation number, the operation time, and the like of the air pump 37 depending on the amount of the air to be supplied to the exhaust gas. By supplying the secondary air to the exhaust gas using the air pump 37, it is possible to maintain activity of the catalyst 29 at all times and efficiently purify the exhaust gas.

According to the present invention, in particular, the air pump 37 is driven by the electric motor 39 as described above. Here, the engine 10 is provided with a flywheel magnet 46 installed to a shaft end of the crankshaft 12 in an upper part of the engine body to rotate in synchronization to serve as a ventilation fan, and a ventilation unit 45 that covers the flywheel magnet 46 and has a flywheel cover 47 connected to a ventilation outlet 122 (refer to FIG. 3) of the engine cover 101A. The ventilation unit 45 externally discharges the air input to the engine housing 118 through the external air intake duct 119 and circulated through the engine housing 118 in order to ventilate the engine housing 118.

As illustrated in FIGS. 2 to 4, a plurality of fins 48 are provided on a top face of the flywheel magnet 46, and rotation of the flywheel magnet 46 makes a wind blowing effect using the fins 48. Through-holes 49 vertically penetrating the flywheel magnet 46 are formed between the neighboring fins 48. The flywheel magnet 46 serving as a ventilation fan sends the air received from the lower side upward through the through-holes 49, and the air is discharged, that is, ventilation is performed (a ventilation flow using the ventilation unit 45 inside the engine housing 118 is denoted by the arrow V in FIGS. 2 to 4). In this case, a ventilation outlet 50 is provided in an upper part of the flywheel cover 47 as illustrated in FIG. 4 and the like, so that the ventilation flow is discharged to the outside of the engine cover 101A as indicated by the arrow V in FIG. 3 or 4.

The flywheel cover 47 has an approximately upset or overturned dish shape or an umbrella shape and is installed and supported in a suitable place such as the crankcase 13 to over-cover the flywheel magnet 46 completely from the upside. In this example, the electric motor 39 is arranged to snuggle down under the flywheel magnet 46, and a part thereof is overlapped with the flywheel magnet 46 as seen in a plan view as illustrated in FIG. 4. In the left side of the flywheel cover 47, an overhang portion 51 is provided to cover the entire upper part of the electric motor 39 along with the flywheel magnet 46 covered by its cover body.

The flywheel cover 47 is opened downward so that the periphery of the overhang portion 51 in this opening serves as the ventilation inlet 52. By virtue of the operation of the ventilation unit 45, the air introduced from the ventilation inlet 52 is discharged upward through the through-holes 49 as described above. The air pump 37 and the electric motor 39 are arranged in the vicinity of the ventilation inlet 52 of the ventilation unit 45 so that the air pump 37 and the electric motor 39 can be cooled using the air flowing to the ventilation unit 45.

In this case, the ventilation inlet 52 of the flywheel cover 47 is provided with a ventilation air inlet hole 52a formed by a gap from the outer circumference of the electric motor 39 to cover at least an upper part of the electric motor 39 as illustrated in FIG. 3.

According to the first embodiment of the invention, the secondary air is supplied to the exhaust gas flowing through the exhaust passage 28 from the air pump 37 using the secondary air supply passage 42 to supply oxygen necessary to oxidize hydrocarbons and carbon monoxides in the exhaust system for detoxification. As a result, oxidization of the exhaust gas is promoted by reacting oxygen with the exhaust gas, and a discharge amount of hydrocarbons and carbon monoxides is reduced. In this case, since the driving of the air pump 37 can be controlled as necessary, it is possible to optimally adjust the supply amount of the secondary air depending on a driving state of the engine 10. As a result, it is possible to ensure optimum activity of the catalyst 29 and improve durability. In addition, by avoiding an unnecessary operation of the air pump 37, it is possible to reduce a loss in the output power of the engine 10 and anticipate improvement of the fuel efficiency.

According to the present invention, in particular, the air pump 37 is an electric type driven by the electric motor 39. That is, as a power source of the air pump 37, for example, a mechanical driving mechanism operated by connecting the crankshaft 12 is not employed. Therefore, there is no restriction in the power source for driving the air pump 37. Since there is no restriction in the power source of the air pump 37 in this manner, it is possible to efficiently utilize an arrangement space of the driving source in the engine housing 118. As a result, it is possible to promote miniaturization of the outboard motor 100.

Since the driving of the air pump 37 can be controlled freely as necessary by controlling the operation of the electric motor 39, an adjustment valve or the like for adjusting a supply amount of the secondary air depending on a driving state of the engine 10 is not necessary. In addition, it is possible to reliably reduce a loss in the output power of the engine 10 by driving the air pump 37 only when necessary.

In addition, since the air pump 37 and the electric motor 39 are arranged in the vicinity of the ventilation inlet 52 of the ventilation unit 45 in the middle of the ventilation air flow formed by the ventilation unit 45, the air pump 37 and the electric motor 39 are cooled by the ventilation air flow. By efficiently using the ventilation air flow in this manner, it is not necessary to provide a separate cooling device dedicated to the air pump 37 and the electric motor 39. Therefore, it is possible to simplify and miniaturize the configuration of the outboard motor 100.

The air inside the engine housing 118 heated by the air pump 37 and the electric motor 39 are efficiently discharged to the outside of the outboard motor 100 using the ventilation unit 45. As a result, it is possible to prevent a temperature increase inside the engine housing 118 and guarantee a suitable and smooth operation of the engine 10.

Further, the ventilation inlet 52 of the flywheel cover 47 is provided with a ventilation air inlet hole 52a formed by a gap from the outer circumference of the electric motor 39. It is possible to concentrate the air introduced from the engine housing 118 to the ventilation unit 45 on the surroundings of the electric motor 39. Therefore, it is possible to improve cooling efficiency of the electric motor 39 and durability thereof.

Second Embodiment

Figure 6:
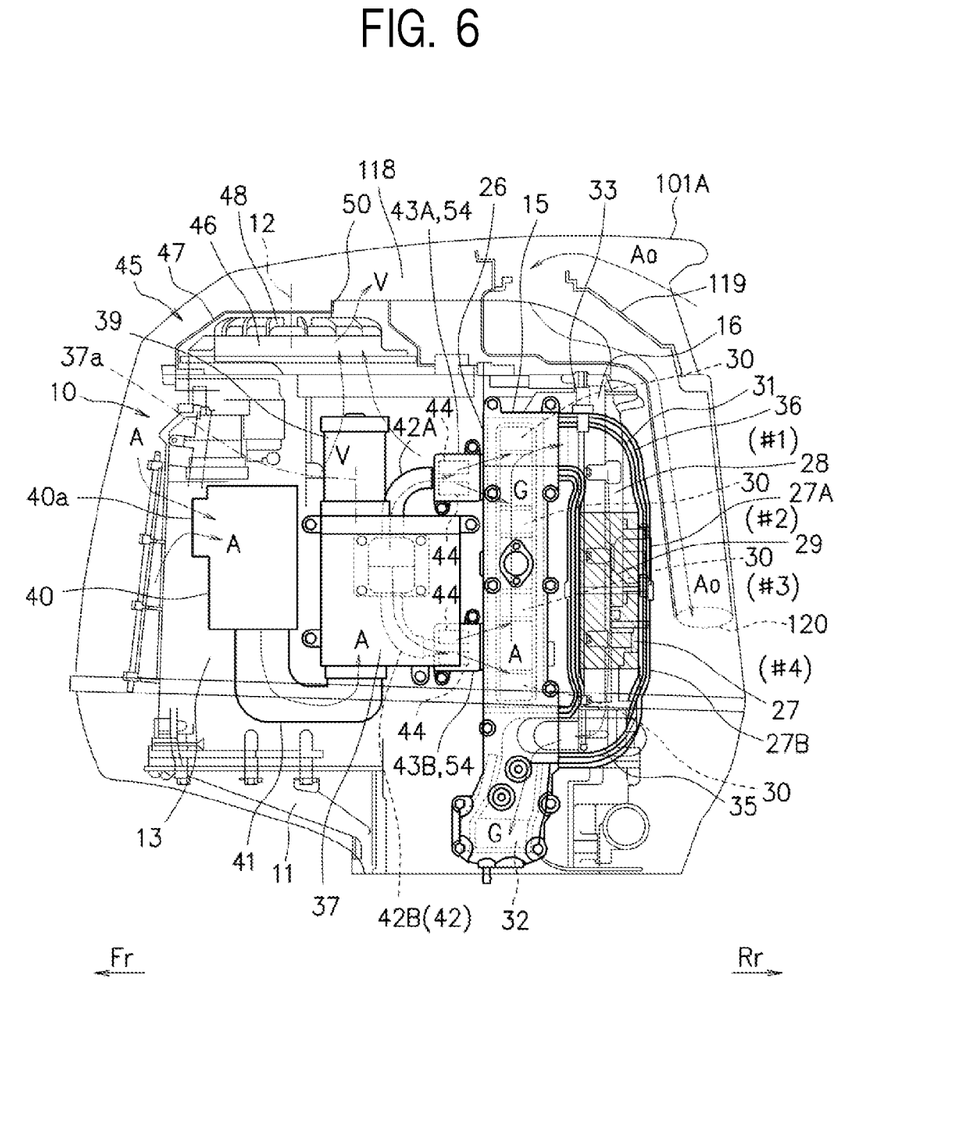
FIG. 6 is a left side view illustrating an engine of an outboard motor according to a second embodiment of the invention.
Figure 7:
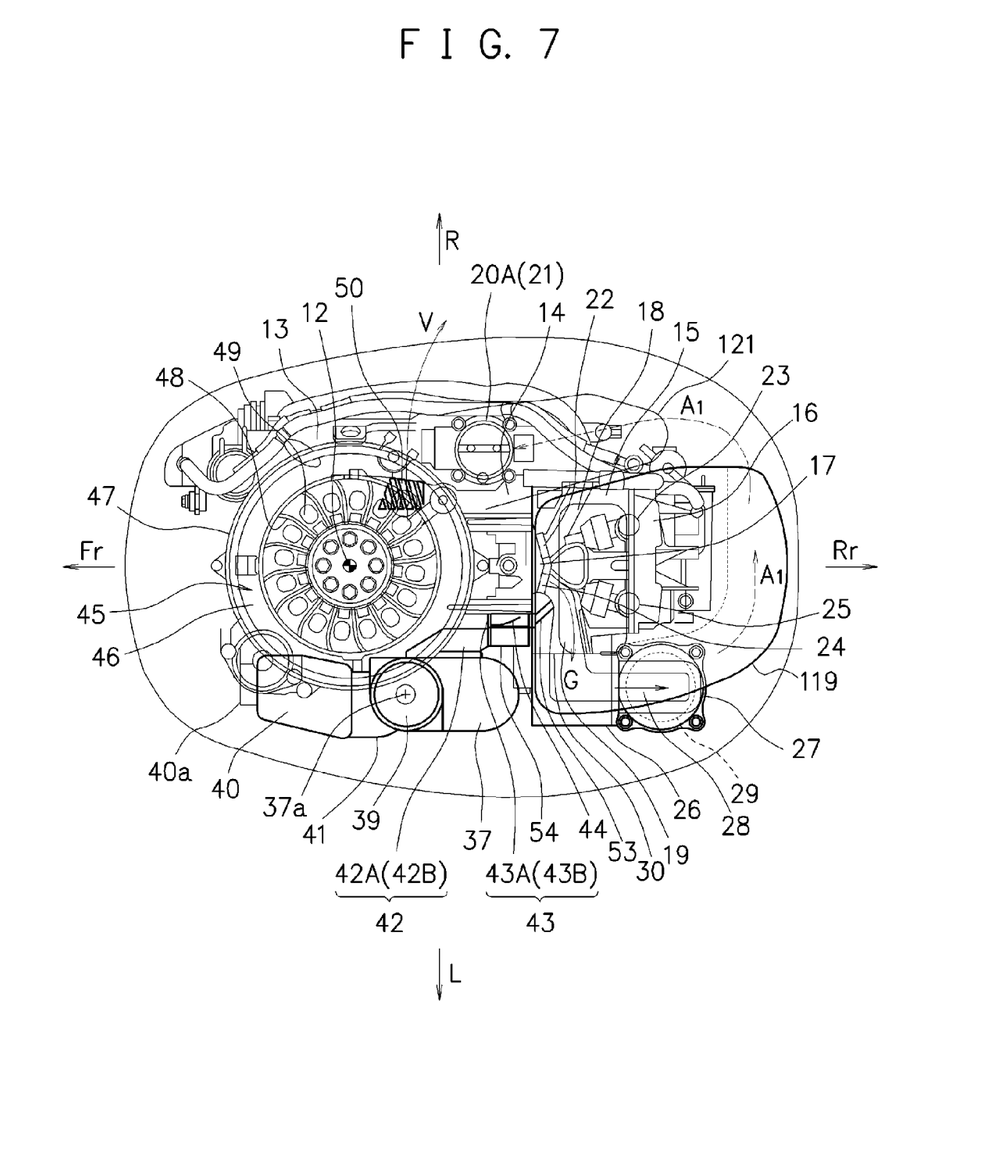
FIG. 7 is a top view illustrating the engine of the outboard motor according to the second embodiment of the invention.

Next, an engine for an outboard motor according to a second embodiment of the invention will be described. FIG. 6 is a left side view illustrating an engine 10 according to the second embodiment, and FIG. 7 is a top view illustrating the engine 10. In the description of the second embodiment, like reference numerals denote like elements as in the first embodiment. A basic configuration of the engine according to the second embodiment is substantially similar to that of the first embodiment. The catalyst housing portion 27 is provided to vertically extend in parallel with the exhaust manifold 26 in a rear side of the exhaust manifold 26 to internally house the catalyst 29. The intake system 21 is arranged in the right side of the engine body, and the exhaust passage 28 and the air pump 37 are arranged in the left side of the engine body.

In the exhaust system, the exhaust gases discharged from the exhaust ports 19 of each cylinder flow to the opening 30 of the exhaust manifold 26 and are joined inside the exhaust manifold 26. The confluent exhaust gas flows upward inside the exhaust manifold 26 and flows into the catalyst housing portion 27 through the connection passage 31 in an upper part thereof. Furthermore, the exhaust gas passes through the catalyst 29 inside the catalyst housing portion 27 and flows into the extension 35 from the lower part of the catalyst housing portion 27. Then, the exhaust gas passes through the exhaust communicating passage 32 inside the engine holder 11 and flows to the middle unit 102 and further the lower unit 103. Then, the exhaust gas is discharged to the water.

According to the second embodiment of the invention, in particular, a connecting portion 43 (43A and 43B) of the secondary air supply passage 42 (42A and 42B) is formed integrally with the cylinder block 14 included in the engine body, and a communicating passage 53 is provided to communicate with each exhaust port 19 of each cylinder. In this case, the secondary air supply passage 42 extending from the right side face of the air pump 37 branches into two separate ways, and the branching secondary air supply passages 42A and 42B are connected to the connecting portions 43A (for the #1 and #2 cylinders) and 43B (for the #3 and #4 cylinders), respectively. Each connecting portion 43A and 43B is formed integrally with the cylinder block 14 and is installed with the reed valve 44. Further, each connecting portion 43A and 43B is installed with a cover 54 to cover the reed valve 44. The secondary air discharge side of each reed valve 44 and the exhaust port 19 are connected to each other by interposing the communicating passage 53.

Similarly, according to the second embodiment of the invention, the intake duct 40a of the air inlet is set vertically higher than the inflow port 120 of the external air intake duct 119 in a front part of the engine housing 118. By arranging the intake duct 40a in such a high position, it is possible to effectively prevent water from mixing with the secondary air supplied to the exhaust passage 28 by the air pump 37 and guarantee a purification effect of the exhaust gas using the secondary air.

According to the second embodiment of the invention, the secondary air from the air pump 37 is supplied to the connecting portions 43A and 43B through the secondary air supply passages 42A and 42B. In each of the connecting portions 43A and 43B, the secondary air output from the reed valve 44 is discharged to the inside of the exhaust port 19 through the communicating passage 53 so that the secondary air is supplied to the exhaust gas.

According to the second embodiment of the invention, in particular, the secondary air supply passage 42 extending from the right side face portion of the air pump 37 branches into two separate ways, and the branching secondary air supply passages 42A and 42B are connected to the cylinder block 14 side in the right side of the air pump 37. That is, the secondary air supply passage 42 is arranged not to protrude to the left side of the air pump 37. Therefore, it is possible to compactify the width of the engine 10 in the left-right direction.

While preferred embodiments of the invention have been described and illustrated hereinbefore, it should be understood that they are only for exemplary purposes and are not to be construed as limitations. Any addition, omission, substitution, or modification may be possible without departing from the spirit or scope of the present invention.

Although the engine 10 is an in-line four-cylinder engine in the embodiments described above, the number of cylinders of the engine 10 may change.

According to the present invention, the air pump is an electric type driven by an electric motor, and there is no restriction in a power source for driving the air pump. As a result, it is possible to efficiently utilize an arrangement space of the driving source in the engine housing and miniaturize the outboard motor.

In addition, the driving of the air pump can be controlled freely as necessary by controlling the operation of the electric motor. Therefore, it is not necessary to provide an adjustment valve or the like for controlling a supply amount of the secondary air depending on a driving state of the engine. In addition, it is possible to reliably reduce a loss in the output power of the engine by driving the air pump only when necessary.

What is claimed is:

1. An engine for an outboard motor comprising:
   an in-line multiple-cylinder engine body provided with a crankshaft having an axial line directed to a vertical direction and a plurality of vertically overlapping cylinders, the cylinders having axial lines directed backward in a horizontal direction;
   an intake system configured to supply combustion air to the engine body;
   an exhaust passage formed to connect the engine body, the exhaust passage being connected to a middle unit and a lower unit provided in a lower part of the engine body;
   a catalyst provided in the exhaust passage; and
   an air pump configured to supply secondary air to an upstream side of the catalyst in the exhaust passage,
   wherein the catalyst is arranged in an upper unit provided over the middle unit,
   wherein the upper unit is configured such that the air pump is driven by an electric motor,
   wherein an air inlet receiving secondary air, the air pump, and the electric motor are arranged in the same side as that of the exhaust passage connected to the engine body, and
   wherein the electric motor is arranged between the air inlet and the exhaust passage connected to the engine body as the engine for an outboard motor is seen in a side view.

2. The engine for an outboard motor according to claim 1, further comprising:
   a ventilation unit provided with a flywheel magnet installed in a shaft end of the crankshaft to rotate in synchronization in an upper part of the engine body to serve as a ventilation fan; and
   a flywheel cover that covers the flywheel magnet and is connected to a ventilation outlet of the engine cover,
   wherein the air pump and the electric motor are arranged in the vicinity of a ventilation inlet of the ventilation unit so that the air pump and the electric motor are cooled using the air flowing to the ventilation unit.

3. The engine for an outboard motor according to claim 2, wherein the ventilation inlet of the flywheel cover comprises a ventilation air inlet hole formed by a gap from an outer circumference of the electric motor to cover at least an upper part of the electric motor.

4. The engine for an outboard motor according to claim 1, wherein the electric motor is arranged over the air pump.

5. The engine for an outboard motor according to claim 1, wherein the air inlet is arranged in a front side of the air pump which is a side face of a crankcase of the engine body.

6. The engine for an outboard motor according to claim 1, wherein the air inlet and the air pump are connected in a side opposite to a side where the electric motor and the air pump are connected.

7. The engine for an outboard motor according to claim 1, further comprising an exhaust manifold, as a part of the exhaust passage connected to the engine body, connected to the air pump through a secondary air supply passage in an upstream side of an exhaust flow direction of the exhaust manifold.

8. The engine for an outboard motor according to claim 1, further comprising a catalyst housing portion, where the catalyst is installed, vertically extending in parallel with the exhaust manifold in a rear side of the exhaust manifold.

9. The engine for an outboard motor according to claim 8, further comprising oxygen concentration sensors, detecting an oxygen concentration of an exhaust gas, installed in an exhaust upstream side and an exhaust downstream side of the catalyst housing portion.

10. The engine for an outboard motor according to claim 8, wherein the catalyst housing portion, where the catalyst is installed, is bisected in a vertical direction.

* * * * *